United States Patent [19]

Roberts et al.

[11] 4,074,670
[45] Feb. 21, 1978

[54] ENGINE EFFICIENCY SYSTEM

[75] Inventors: Charles Roberts, Howell; Ernest DeMichele, Farmington Hills, both of Mich.

[73] Assignee: Mectronic Inc., Detroit, Mich.

[21] Appl. No.: 604,792

[22] Filed: Aug. 14, 1975

[51] Int. Cl.$^2$ .......................... F02N 7/00; F02B 77/00
[52] U.S. Cl. ............................... 123/119 E; 123/1 R; 123/139 AV; 123/198 R
[58] Field of Search ................ 123/119 E, 139 AV, 1, 123/198 R

[56] References Cited
PUBLICATIONS

Ford, 1974 vol. II, Car Shop Manual, title page and pp. 21-24-2.
Dodge, 1973, Passenger Car Chasis Service Manual, title page and pp. 8-128.

*Primary Examiner*—Wendell E. Burns
*Attorney, Agent, or Firm*—Gifford, Chandler, Sheridan & Sprinkle

[57] ABSTRACT

A pair of closely adjacent electrically conductive coils, suitably encapsulated, are secured to or retained closely adjacent an electrical accessory and a fuel line of an internal combustion engine. When the engine is utilized to drive a rubber-tired motor vehicle a ground strap is provided to provide an electrical connection around the insulation produced by the rubber tires and the rubber motor mounts of the engine.

6 Claims, 5 Drawing Figures

U.S. Patent
Feb. 21, 1978
4,074,670
FIG.1
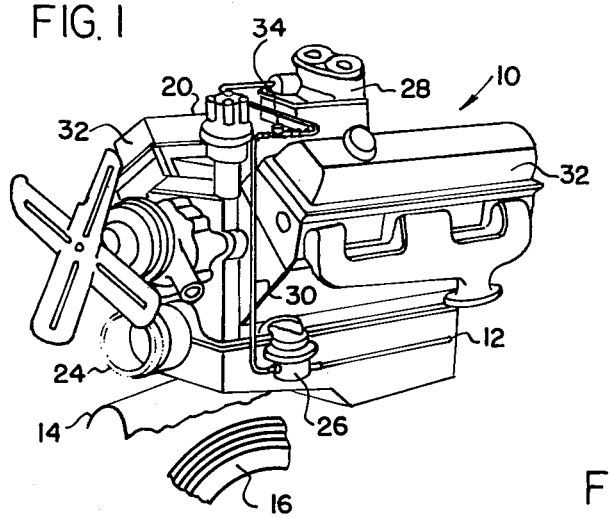
FIG.2
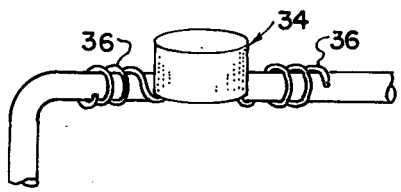
FIG.3
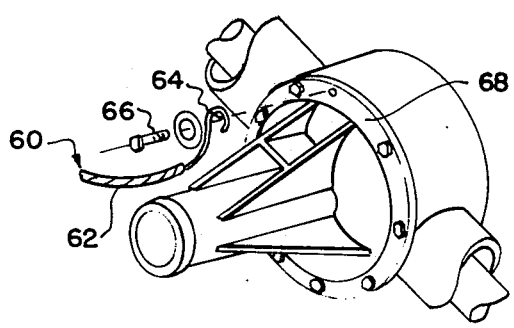
FIG.4
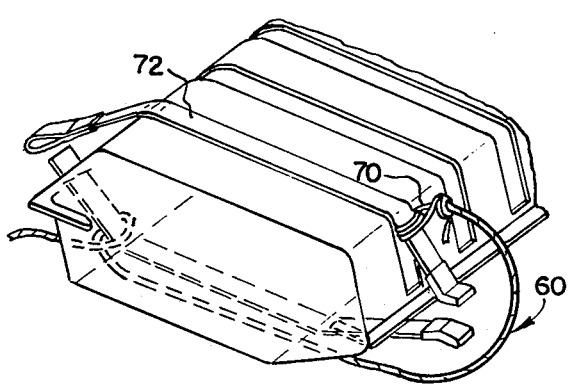
FIG.5

ENGINE EFFICIENCY SYSTEM

BACKGROUND OF THE INVENTION

I. Field of the Invention

The present invention relates to devices connected to internal combustion engines to improve the efficiency thereof.

II. Description of the Prior Art

While devices of many kinds have been heretofore utilized to increase engine efficiency, to our knowledge no attempt has heretofore been made to provide a device which utilizes the magnetic fields produced during ordinary engine operation to produce electrical energy to ionize the gasoline or other fuel to thereby improve its combustion characteristics.

SUMMARY OF THE INVENTION

The present invention comprises a pair of closely adjacent, oppositely wound, electrically conductive coils, preferably encapsulated and mounted closely adjacent a fuel line of an internal combustion engine and within the induction field produced by operation of an electrical component of the engine. The coils have their ends connected to each other and respectively enclose iron core members. The number of windings on one coil are preferably three times the number of windings on the other coil member.

While we are not certain of the scientific principles upon which the device operates it is clear that when constructed and mounted as described above, the above increases the efficiency of an internal combustion engine.

One theory is that the magnetic fields produced by the electrical components induces an electrical current in the coils which in turn produces a magnetic field around the device. The fuel flowing through the fuel line passes through the magnetic field and is ionized, thereby enhancing its combustion characteristics.

It has been found that when the device of the invention is mounted to a rubber tired vehicle it is necessary to connect a grounding wire between a component of the drive train and the body of the vehicle. Without this, experience has demonstrated that the device will lose its effectiveness over a period of time. It is felt that this results from a build up of electrical energy and the ground wire dissipates this electrical energy through the drive train, around the rubber tires, to the body of the vehicle.

DESCRIPTION OF THE DRAWINGS

A better understanding of the present invention will be achieved upon reference to the following drawings in which like reference characters refer to like parts throughout the several views and in which:

FIG. 1 is a fragmentary, exploded perspective view of a portion of a motor vehicle utilizing the device of the present invention;

FIG. 2 is an enlarged perspective view of a portion of the structure shown in FIG. 1 illustrating the coil device mounted to the fuel line of the engine;

FIG. 3 is a fragmentary perspective view of a portion of a motor vehicle illustrating a preferred connection of one end of the ground wire;

FIG. 4 is a view similar to FIG. 3 but illustrating a preferred connection of the other end of the ground wire; and FIG. 5 is an elevational view of the device of the present invention enlarged for purposes of clarity and illustrating portions in phantom.

DESCRIPTION OF THE PREFERRED EMBODIMENT

Now referring to the drawings for a more detailed description of the present invention a portion of a motor vehicle 10 is illustrated in FIG. 1 as including an internal combustion engine 12, a body 14 and rubber tires 16 (only a portion of one of which is shown).

Still referring to FIG. 1 the engine 12, as is common, includes a number of electrical components including a distributor 20, spark plugs (not shown), an alternator 24 and ignition wires (not shown) connecting the spark plugs to the distributor 20. A fuel system is also provided and includes a fuel pump 26, a carburetor 28 and fuel lines 30 connecting the fuel pump 26 to the carburetor 28.

The engine 12 illustrated in FIG. 1 includes a pair of cylinder heads 32 commonly recognized as being a V-8 engine. It should be understood, of course, that other engine designs can be used with the fuel efficiency device of the present invention.

In FIGS. 1 and 2, an efficiency unit 34 is illustrated as being mounted to the fuel line 30 preferably intermediate the fuel pump 26 and the carburetor 28 within a field produced by one of the electrical components, such as the distributor 20, of the engine 12. The unit 34 has a pair of wires 36 which as can best be seen in FIG. 2 are preferably wrapped around the fuel line 30 to hold the unit 34 in place. The wires 36 function only as means to hold the unit 34 in place and it should be understood that other means could be used as well to perform this function. The unit 34 is preferably mounted high on the engine 12 as shown in FIG. 1 near the forward portion thereof.

Although it has been preferred to illustrate the unit 34 as being within the induction field generated around the distributor 20, in practice any other induction field generating accessory of the internal combustion engine can be used as well.

FIG. 5 illustrates the unit 34 in greater detail as including a pair of spaced but adjacent electrically conductive coils 40 and 42 disposed about substantially parallel axes and preferably wound in opposite directions. The coils 40 and 42 may be of any preferred number of fine wire windings but it is preferred that the number of windings of one coil be approximately three times the number of windings of the other coil. Thus in the device as actually manufactured the coil 42 has 90 windings and the coil 40 has 30 windings. The ends of the coils 40 and 42 are connected by leads 41 and 43 which extend through an insulating body 44 which encapsulates the coils 40 and 42. Iron cores 45 and 47 are disposed within the coils 40 and 42, respectively.

Still referring to FIG. 5 the fastening means 36 is seen to be a single wire extending from the body 44 and separated from the coils 40 and 42 by the body 44.

The unit 34 is preferably disposed on the fuel line 30 such that the axes of the coils 40 and 42 are disposed parallel to the axis of the induction field surrounding the distributor 20.

The unit 34 mounted as shown in FIGS. 1 and 2 has been found to provide improved fuel mileage. As indicated above it is thought that the reason for this is that field induced around the coils 40 and 42 by the induction field of the distributor 20 or other electrical component ionizes the gasoline flowing through the line 30 and thereby enhances its combustion characteristics.

It has been found, however, that while initial results with the unit 34 are very satisfactory there is a gradual drop in the results achieved as the unit is used for a period of time. It is thought that this is due to a build up in electrical energy around the unit 34 and the engine 12 itself which somehow affects the operation of the unit 34. Rubber motor mounts (not shown) and the rubber tires 16 prevent a discharge of the electrical energy and cause the buildup. To overcome this the ground wire 60 shown in FIGS. 3 and 4 is provided and is connected between members electrically conductively connected to the engine 12 and to the body 14 so that there is an electrical path therebetween.

In FIG. 3 the ground wire 60 is shown as having an insulating cover 62 and an end 64 connected to one of the bolts 66 on the differential housing 68. The differential is of course a part of the drive train of the vehicle and is connected directly to the engine 12.

As can best be seen in FIG. 4 the other end 70 of the ground wire 60 is preferably wrapped around one of the mounting straps 72 for the gas tank 74. The straps 72 are connected to the body 14 so that the ground wire 60 provides an electrical connection between the engine 12 and the body 14 to thereby provide an electrical discharge path which prevents a buildup of electrical energy in the coils 40 and 42.

Although we have described a single embodiment of the present invention many changes and modifications can be made therein without departing from the spirit of the invention as expessed by the scope of the appended claims.

We claim:
1. In combination with an internal combustion engine having a fuel line and an electrical system including means generating an electrical induction field, an engine efficiency device comprising:
   a pair of closely adjacent electrically conductive coils disposed on substantially parallel axes and located within said induction field, said coils comprising windings having their ends connected with each other, and
   means mounting said device adjacent said fuel line, said means comprising a wire member electrically insulated from said coils.
2. The combination as defined in claim 1 and in which said coils are encapsulated in a non-electrical conducting body.
3. The combination as defined in claim 1 and in which said internal combustion engine is mounted in a motor vehicle, said vehicle having rubber tires and further including a differential connected with said engine, and also a body, a gasoline tank and straps mounting said tank to said body, said invention further comprising an electrical conducting member connected between said differential and one of said gasoline tank straps.
4. The combination as defined in claim 1 and in which said generating means includes the distributor for said engine.
5. The invention as defined in claim 1 and including core members disposed within said coils.
6. The invention as defined in claim 1 and in which one of said coils has approximately three times the number of windings as the other of said coils.

* * * * *